United States Patent [19]

Rohde

[11] Patent Number: 4,765,384

[45] Date of Patent: Aug. 23, 1988

[54] PNEUMATIC VEHICLE TIRE TREAD

[75] Inventor: Dieter Rohde, Lehrte, Fed. Rep. of Germany

[73] Assignee: Continental Aktiengesellschaft, Hanover, Fed. Rep. of Germany

[21] Appl. No.: 5,940

[22] Filed: Jan. 22, 1987

[30] Foreign Application Priority Data

Jan. 24, 1986 [DE] Fed. Rep. of Germany ....... 3602102

[51] Int. Cl.[4] ............................................. B60C 11/11
[52] U.S. Cl. ................................................ 152/209 R
[58] Field of Search ............ 152/209 R, 209 B, 209 D; D12/136, 140

[56] References Cited

U.S. PATENT DOCUMENTS

| 3,450,182 | 6/1969 | Verdier | 152/209 R |
| 3,976,115 | 8/1976 | Mirtain | 152/209 R |
| 3,982,579 | 9/1976 | Mirtain | 152/209 R |
| 4,262,722 | 4/1981 | Takigawa et al. | 152/209 R |
| 4,567,929 | 2/1986 | Els | 152/209 R |

Primary Examiner—Michael Ball
Assistant Examiner—Geoffrey L. Knable
Attorney, Agent, or Firm—Becker & Becker, Inc.

[57] ABSTRACT

A pneumatic vehicle tire for trucks, especially for the drive axles thereof. In the region of the edges of the tread, the tire has circumferential rows of blocks separated by grooves that open freely to the sides. Provided to both sides of the laterally outwardly disposed rows of blocks is a practically cylindrical surface. In order to increase the capacity of the shoulder regions of the tire to withstand dynamic stresses, and also in order to increase the support surface of the tire upon soft ground, the base of the aforementioned grooves merges in a stepless manner with the lateral cylindrical surfaces. Advantageously, the laterally outwardly disposed edges of those blocks that form the edges of the tread merge with steep side surfaces that are disposed perpendicular to the cylindrical surfaces.

1 Claim, 1 Drawing Sheet

PNEUMATIC VEHICLE TIRE TREAD

BACKGROUND OF THE INVENTION

1. Field of the Invention

The present invention relates to a pneumatic vehicle tire, preferably for a truck, with the tire in particular being suitable for use on the drive axles of the vehicle. The tire is a belted tire, i.e. is provided with an inextensible belt to stabilize the sides of the tire. The tire has a tread construction which, in addition to the rows of blocks in the central portion of the tread, also includes a row of blocks in each of the edge regions of the tread.

2. Description of the Prior Art

It is known to provide approximately cylindrical surfaces on both sides of the side rows of blocks in the shoulder region of the tire. These cylindrical surfaces thus connect on both sides to the active portion of the tread strip or tread surface. With the heretofore known tires, the tread profiling is embodied in such a way that those grooves of the profiling that open out freely to the outer sides, merge with the aforementioned, laterally disposed cylindrical surfaces via a considerable step or shoulder. This configuration of the edges of the tread leads to distinct deformations and stresses in the region of the tire shoulders.

The object of the present invention is essentially to design a tire of the aforementioned general type in such a way that the tire has shoulder portions which can be stressed in a dynamically favorable manner, and that, at the same time, the tire has a wide support surface when the ground beneath the actual tread is soft, with this support surface being in contact with the ground when the latter is hard. In other words, the support surface of the tread makes contact with hard ground and both the support surface and the smooth cylindrical surface contact the ground when the ground is soft.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
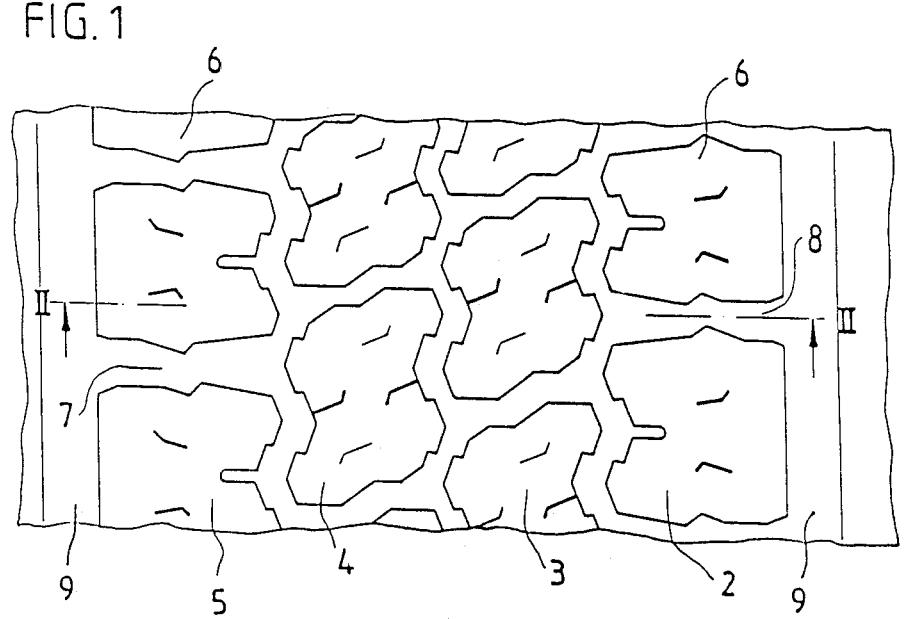
FIG. 1 is a partial plan view of one exemplary embodiment of the tread zone of an inventive pneumatic vehicle tire, which is preferably intended for commercial vehicles, and is especially for use on the drive axles.
Figure 2:
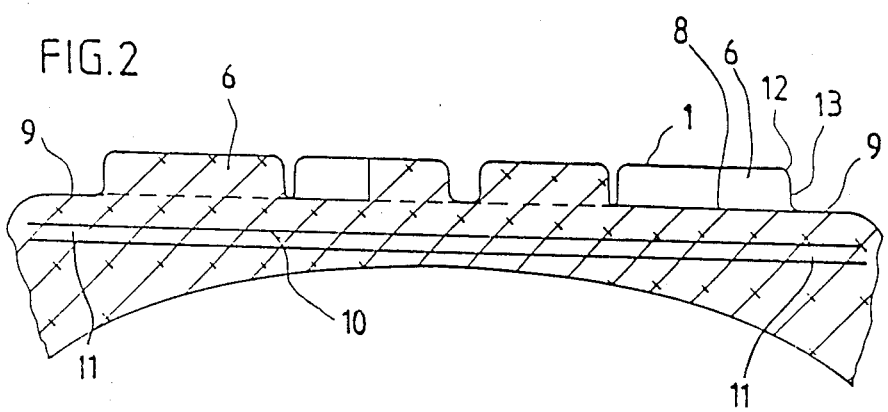
FIG. 2 is a radial, cross-sectional view through the zenith portion of the tire of FIG. 1, being taken along the line II—II thereof.

The tire of the present invention is characterized primarily in that the base of the aforementioned grooves, which open out freely on the laterally outer side, merge, in the tire shoulder regions, with the approximately cylindrical side surfaces in a continuous, i.e. stepless, manner.

Thus, at least in the region of the edges of the tread, the base of the profiled grooves is disposed at the same level as the approximately cylindrical side surfaces that are disposed on both sides of the tread. This eliminates tearing and notching effects, and also reduces the dynamic stress on the shoulders of the tire.

The inventive embodiment of the shoulder portions of the tire is particularly intended for those belted tires where the belt has such a width that its edges are disposed below the aforementioned cylindrical surfaces. As a result, an advantageous effect is additionally exerted upon the dynamic stress in the region of the edges of the tread; the edges of the belt, to some extent, lead to a stabilizing of the edge zones on the tread.

Further specific features of the present invention will be described in detail subsequently.

DESCRIPTION OF PREFERRED EMBODIMENTS

Referring now to the drawing in detail, the tread 1 of the tire is formed by four rows of blocks 2, 3, 4, and 5. The pertaining blocks 6 are separated from one another by transversely extending grooves 7 that in the rows of blocks 2 and 5 open freely to the side. The base of these grooves 7 is designated by the reference numeral 8.

Disposed to both sides of the rows of blocks 2 and 5 are smooth cylindrical surfaces 9 that merge in a stepless manner with the base 8 of the groove 7. At the same time, and to further stabilize the edges of the tread, the inextensible belt 10 of the tire is embodied in such a way that the sides or edges 11 of this belt are surrounded or encircled by the cylindrical surfaces 9.

The side edges of the blocks 6 are rounded off, as indicated by the reference numeral 12. The laterally outwardly disposed surfaces 13 of the blocks 6 are disposed essentially perpendicular to the side surfaces 9, in other words, these surfaces 13 extend essentially radially.

The present invention is, of course, in no way restricted to the specific disclosure of the specification and drawing, but also encompasses any modifications within the scope of the appended claims.

What I claim is:

1. A pneumatic vehicle tire having a tread comprising: a support surface with circumferential rows of blocks, including a laterally outer row along each laterally outer edge of said tread, with said blocks being separated from one another by grooves that have a base, with the grooves of said laterally outer rows of blocks extending essentially transverse to the circumferential direction of said tire and opening freely to the laterally outer side of these laterally outer rows; said tire having
   a respective, smooth essentially cylindrical surface extending directly laterally outwardly adjacent to the laterally outer side of each of said laterally outer rows of blocks, with the bases of said grooves of said laterally outer rows merging directly laterally outwardly in a continuous, stepless manner with the adjacent smooth cylindrical surface such that only said support surface of said tread makes contact with hard ground and both said support surface and said smooth cylindrical surface contact the ground when the ground is soft; and
   a belt disposed radially inwardly of said tread, with said belt extending in the circumferential direction of said tire and having side edges that extend laterally beyond the outer sides of said laterally outer rows of blocks and below said laterally outwardly extending cylindrical surfaces so as to be encircled by the latter, said blocks of said laterally outer rows of blocks having rounded-off laterally outwardly disposed edges that merge with essentially radially extending side surfaces that are essentially disposed perpendicular to said laterally outwardly extending cylindrical surfaces.

* * * * *